United States Patent Office 3,534,523
Patented Oct. 20, 1970

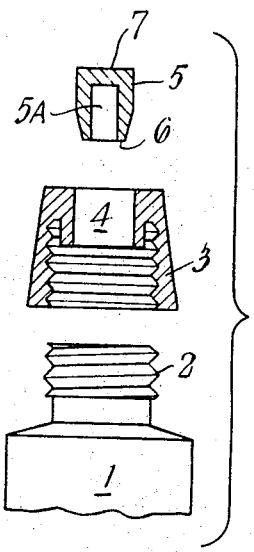
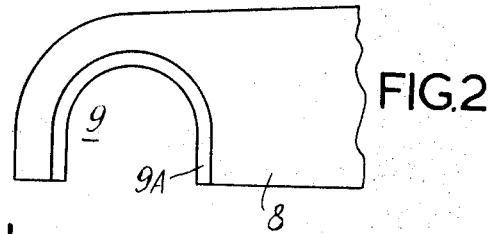
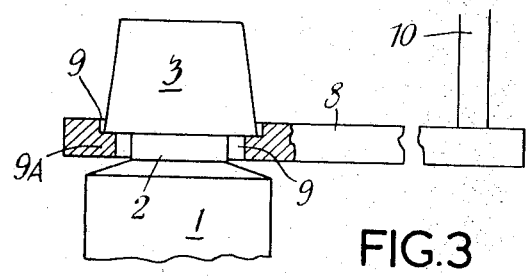
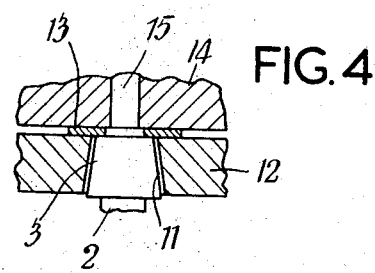
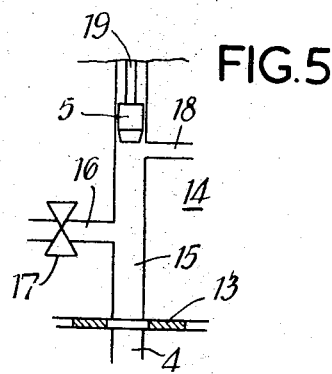
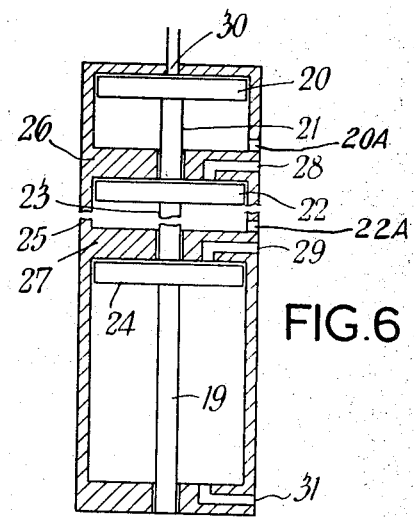

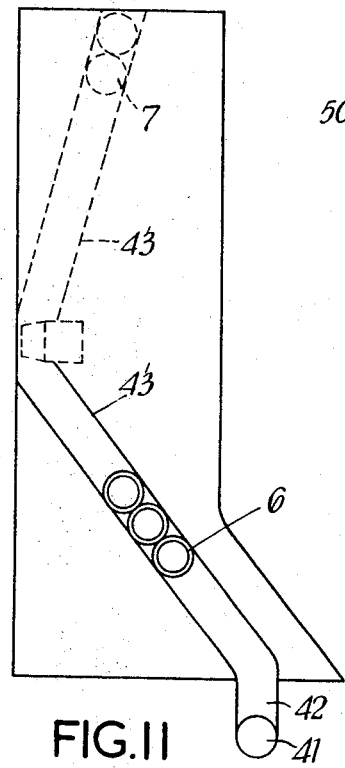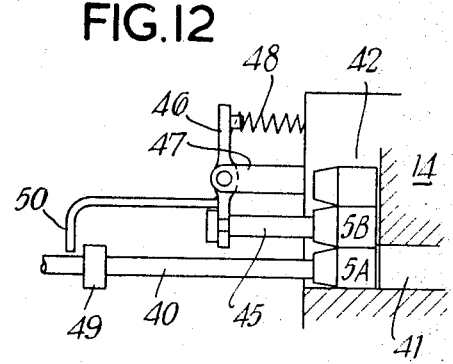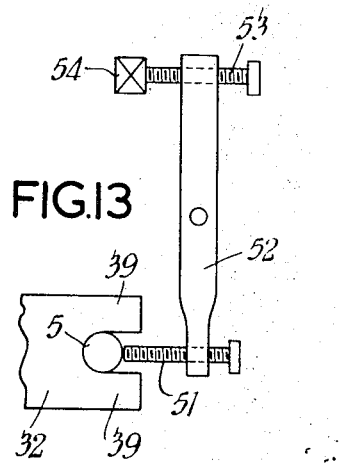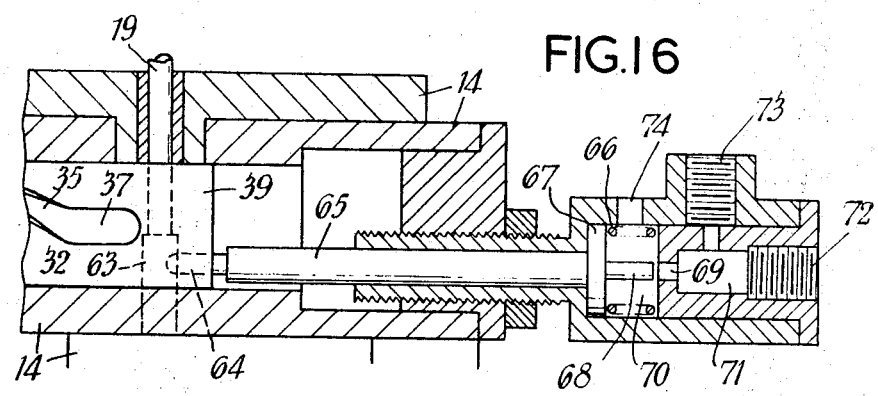

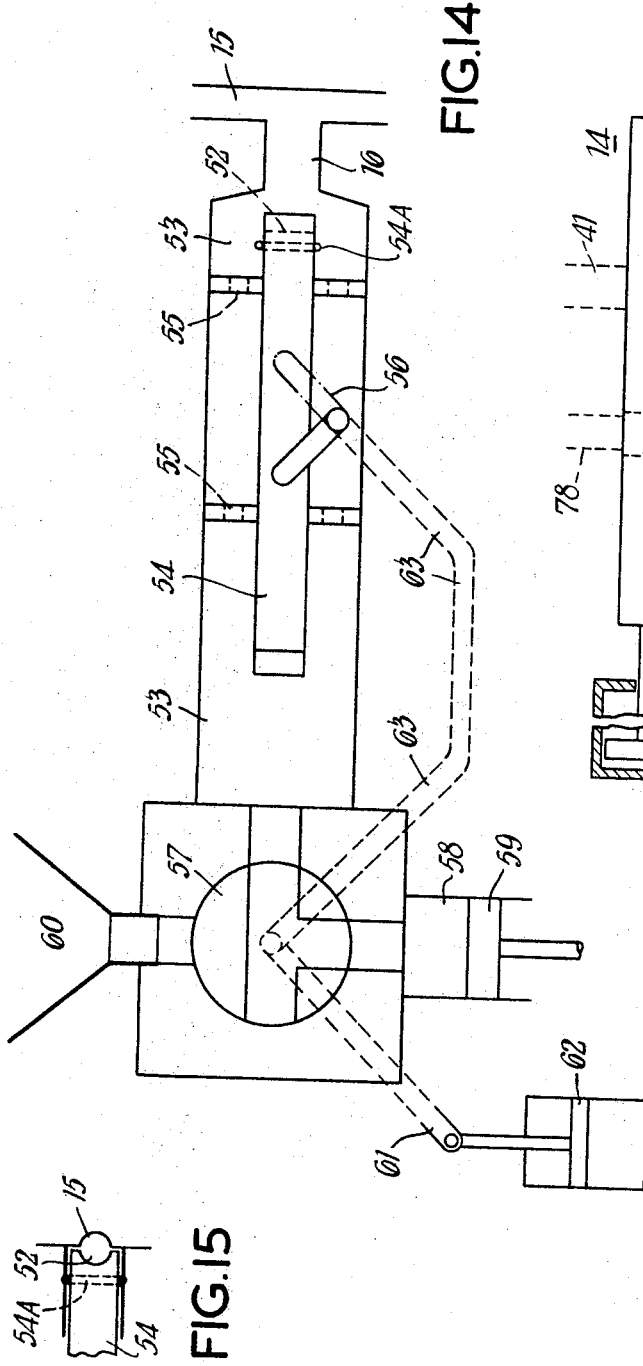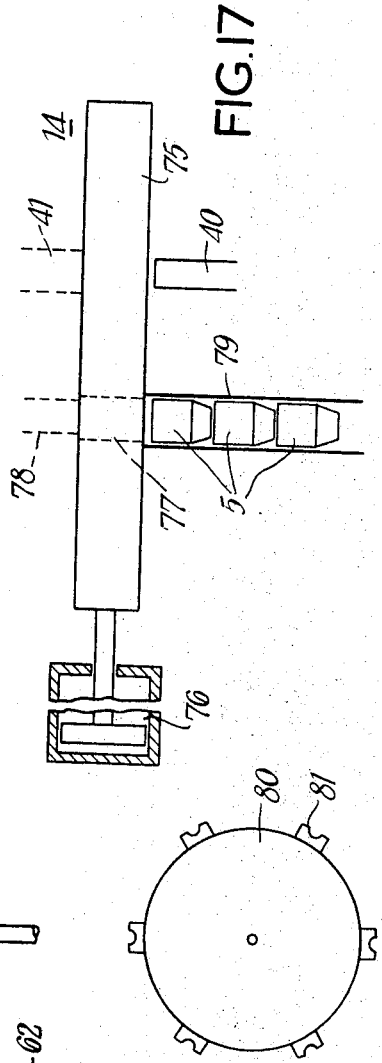

1

3,534,523
MACHINE FOR CHARGING CONTAINERS WITH A FLOWABLE MATERIAL AND FOR SEALING EACH OF THEM WITH A PLUG MEMBER
Eric Brown Davidson, Ewshot, Surrey, and Alan Stewart, Basingstoke, England, assignors to Brown Davidson and Company Limited, Hartley Wintney, Hampshire, England, a British company
Filed Nov. 2, 1967, Ser. No. 680,059
Claims priority, application Great Britain, Nov. 9, 1966, 50,331/66
Int. Cl. B65b 57/06, 3/12
U.S. Cl. 53—63                           13 Claims

ABSTRACT OF THE DISCLOSURE

A machine for filling containers, for example plastics tubes each with a screw cap formed with a filling opening, fills each container while a plug member for sealing the container is in a "ready" position and then the plug member is moved from the "ready" position and introduced into the filling opening in the container in order to seal it. There is an arrangement for sensing whether or not a plug member is in the "ready" position and for initiating the filling operation only if this is so. There is also an arrangement for separating the leading plug member from a row of plug members and advancing it to the "ready" position while the next one in the row is kept still.

---

This invention relates to the charging of containers with a flowable material.

The invention is concerned with a machine for charging with a flowable material a succession of containers each having a filling opening and for sealing each of them with a plug member when it has been charged, comprising a passageway, support means for supporting the containers one at a time with the filling opening presented to one end of the passageway, delivery means for delivering said material into the passageway and thence into a container supported by said support means, a plunger which can move along the passageway, actuating means for moving the plunger along the passageway towards said one end and for subsequently moving it back again, and supply means for placing plug members one at a time in a position in the path of the movement of the plunger towards said one end but not impeding the delivery of said material to said container, the arrangement being such that after said material is delivered into said container the plunger pushes a plug member from said position along the passageway and into the filling opening of said container, sealing the opening.

In operation of one previously proposed form of such a machine, it sometimes happens that a plug member does not reach the aforementioned position when it should and the result is that a container is charged with the flowable material and this subsequently leaks out of the container because the container is not sealed by a plug member. The time taken to make the necessary cleaning operations is substantial and this constitutes a serious disadvantage of the machine. This disadvantage is overcome according to one aspect of the present invention by providing a machine of the kind indicated above which is characterised by control means which senses whether or not a plug member is in said position and controls initiation of delivery of said material as aforesaid by said delivery means such that material is delivered into said container if and only if a plug member is in said position.

In the machine according to the prior proposal there is a first duct which extends at right angles to the passageway and opens into the passageway and there is a second

2 duct which extends at right angles to the first duct and opens into the first duct. The second duct is vertical and contains a column of plug members lying one on another which advance towards the first duct under gravity. The first duct is horizontal and contains a row of plug members lying one beside another which are advanced towards the passageway by a plunger which is operated by a pneumatic piston-and-cylinder arrangement. It sometimes happens that this supply means for the plug members fails because two plug members tend to enter the first duct or the passageway simultaneously and jamming occurs. This disadvantage is overcome according to a second aspect of the present invention by providing a machine of the kind indicated at the beginning which is characterised in that the supply means for the plug members is such as to produce a plurality of the plug members moving forward in a row and touching one another, separate the leading plug member in the row and feed it to said position and prevent the next plug member in the row from immediately following the separated leading plug member.

Examples in accordance with the invention are described below with reference to the accompanying drawings, in which:

FIG. 1 shows part of a container, a filling cap for screwing on the container and a plug member for insertion in a filling opening in the filling cap, FIG. 2 shows a plan view of part of a support plate in a machine for charging a succession of such containers through the filling openings and for inserting the plug members in the filling openings;

FIG. 3 shows a side view of the plate supporting a container with a filling cap on it;

FIG. 4 shows a filling cap and parts of the machine which receive it and guide the plug member into it;

Figure 7:
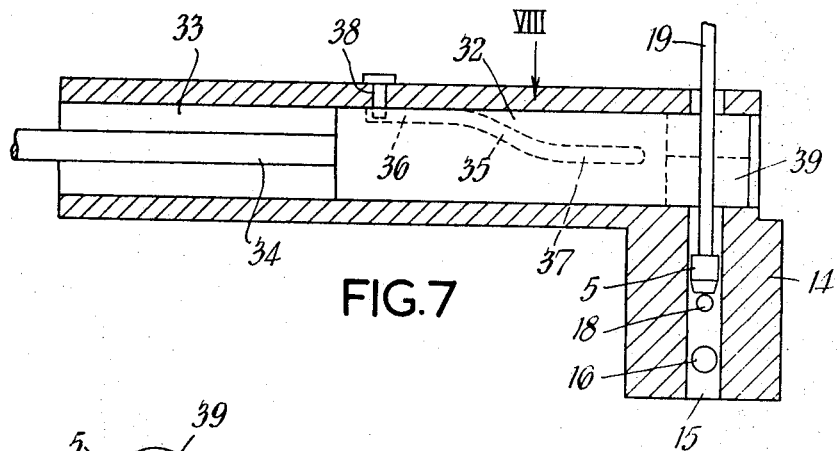
Figure 9A:
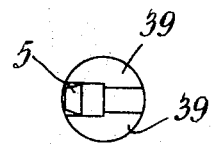
Figure 8:
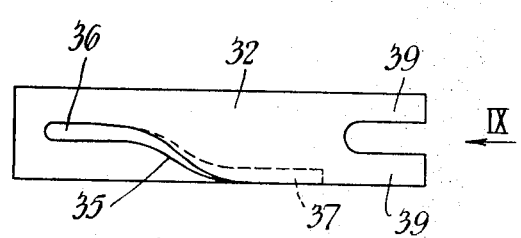
Figure 9B:
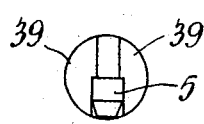
Figure 10:
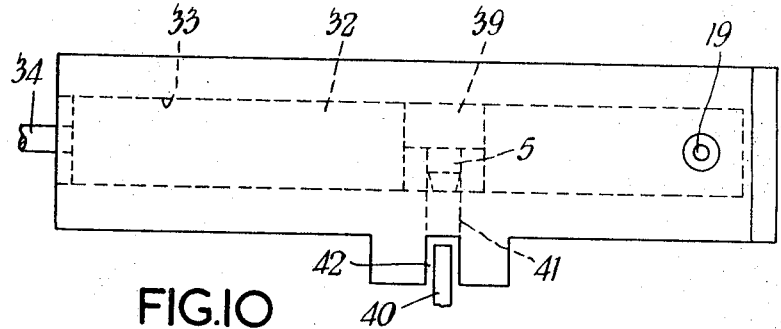

FIG. 5 diagrammatically illustrates how the plug member is caused to approach the filling cap;

FIG. 6 shows diagrammatically a three-stage piston and cylinder arrangement for advancing the plug member;

FIG. 7 illustrates a plug-transporting member and means for guiding its movement;

FIG. 8 shows a view of the plug-transporting member as seen in the direction of the arrow VIII in FIG. 7;

FIGS. 9A and 9B show one end of the plug-transporting member with a plug member in it, as seen in the direction of the arrow IX in FIG. 8 and in two positions of the plug-transporting member;

FIG. 10 shows a plan view of means for supplying plug members to the plug-transporting member shown in FIGS. 7, 8, 9A and 9B;

FIG. 11 shows a gravity-feed arrangement for the plug members;

FIG. 12 shows means for preventing the second plug member of a row of plug members received from the device of FIG. 11 from moving forward;

FIG. 13 shows an arrangement for sensing whether or not a plug member is in the position illustrated in FIG. 9B;

FIG. 14 diagrammatically shows a valve arrangement in the machine;

FIG. 15 shows a plan view of part of what is shown in FIG. 14;

FIG. 16 shows a part of a modified version of the machine and illustrates an arrangement which can be used instead of the arrangement shown in FIG. 13, FIG. 17 shows another part of the modified version and illustrates an arrangement which can be used instead of the arrangement shown in FIG. 12, and FIG. 18 illustrates a turntable.

The drawings are purely diagrammatic and not to scale.

The machine shown in FIGS. 2 to 15 is designed to fill with readily flowable material, for example liquid shampoo, or a mastic composition, for example a heavy grease, a succession of flat plastics tubes 1 (FIG. 1), each formed with a screw-threaded neck 2. Before the tubes are brought to the machine for the filling to be commenced, an internally screw-threaded cap 3 is screwed on to the neck 2 of each tube. The filling is effected through a filling opening 4 in the cap 3, the filling opening 4 being of uniform circular cross-section throughout its length and communicating with a passage through the neck 2. After the filling has been completed, a plug member 5 is inserted in the filling opening 4 and seals it. The plug member 5 has a length about equal to that of the filling opening 4 and it is in the form of a cylinder which is chamfered at one end 6 but not at the other end 7 and has a recess 5A, of circular cross-section, extending into it from the end 6, the recess being co-axial with the plug member itself. The cap 3 and the plug member are both made from plastics material and the plug member is inserted in the cap with the end 6 foremost. What is shown in FIG. 1 is the subject of a prior proposal.

FIG. 2 shows a plan view of part of a support plate 8 and FIG. 3 shows a side view of the plate supporting a tube 1 with a cap 3 screwed on it, part of the neck 2 and part of the cap 3 lying in a recess 9 in the plate, which recess is wider at the top than it is at the bottom so that there is formed a shoulder 9A on which the cap rests. A rod 10 is fixed to the plate 8 and to the piston (not shown) of a pneumatically operated piston and cylinder arrangement above the plate 8, by operation of which the plate 8, and with it the tube 1 and the cap 3, can be lifted from a lower position, in which the tube and the cap are first mounted on the plate 8, to an upper position in which the cap 3, as shown in FIG. 4, lies in a tapered hole 11 in a member 12 and the top of the cap is pressed against a rubber sealing ring 13 which lies between the member 12 and a block 14. The block 14 contains a vertical passageway 15, to the lower end of which the filling opening 4 in the cap 3 is presented. The plate 8 could be coupled to a piston situated below it instead of above it.

FIG. 5 diagrammatically illustrates a duct 16 opening into the passageway 15 and a delivery valve 17 which, when it is open, permits the material with which the tube 1 is to be filled to pass along the duct 16, into the passageway 15, through the filling opening 4 in the cap 3 and into the tube 1. FIG. 5 also shows a second duct 18 which opens into the passageway and leads to a vacuum pump which is permanently in operation or is operated only when required. The figure also shows a plug member 5, with its end 6 lowermost, in the passageway 15, which it fits sufficiently closely for the plug member to be prevented from falling in the passageway 15 under its own weight. A plunger in the form of the lower end of a vertical rod 19 lies in the passageway 15 and can be moved along the passageway towards the filling opening 4, pushing the plug member 5 in front of it, and it can also be moved in the reverse direction.

With the plug member 5 in the position illustrated in FIG. 5 and the delivery valve 17 closed, and with the cap 3 and the tube 1 in the positions indicated in FIG. 4, the tube 1 is evacuated through the filling opening 4, the passageway 15 and the duct 18 and then the rod 19 is lowered until the plug member 5 closes the mouth of the duct 18, whereupon the delivery valve 17 is opened and the material flows into the tube. When the filling operation has been completed, the delivery valve 17 is closed and the rod 19 is lowered sufficiently to push the plug member 5 into the filling opening 4 to seal it.

The plug member 5 is brought into the position shown in FIG. 5 by a previous downward movement of the rod 19. When the plug member 5 has been inserted in the filling opening 4, the rod 19 is moved upwardly to a position above that which is shown in FIG. 5.

The movements of the rod 19 are effected by a three-stage piston and cylinder arrangement which is diagrammatically shown in FIG. 6. This arrangement comprises a first piston 20 secured to a first piston rod 21, a second piston 22 which is fixed to a second piston rod 23 and is abutted by the piston rod 21, and a third piston 24 which is fixed to the rod 19 and is abutted by the second piston rod 23. The pistons are mounted in a cylinder 25 which is provided with internal shoulders 26 and 27, through which the piston rods 21 and 23 pass without leakage of air and through which extend air ducts 28 and 29, there being air ducts 30 and 31 extending through the top and bottom of the cylinder 25 and air holes 20A and 22A extending through its side. To bring the rod 19 to the position shown in FIG. 5, air is admitted through the duct 30 and presses the piston 20 downwardly until it encounters the shoulder 26, with the result that the pistons 22 and 24 and the rod 19 are moved downwardly to the same extent and the plug member 5 is brought to the position indicated in FIG. 5. When, later, the plug member 5 is to be moved lower, so as to block the mouth of the duct 18, air is supplied to the cylinder 25 through the duct 28 and it presses the piston 22 downwardly until it encounters the shoulder 27, the result of this being that the piston 24 and the rod 19 are moved downwardly to the same extent, the piston 20 remaining stationary, and the plug member 5 is advanced to the required position. When, later still, the plug member 5 is to be thrust into the filling opening 4, air is admitted into the cylinder 25 through the duct 29 and it presses the piston 24 downwardly until it encounters the bottom of the cylinder 25, the pistons 20 and 22 remaining stationary, by which time the plug member 5 will be in the filling opening 4. Subsequently, all the pistons 20, 22 and 24 are lifted to their original positions by supplying air to the cylinder 25 by way of the duct 31.

The first of the downward movements of the rod 19 takes the plug member 5 into the passageway 15 out of a plug-transporting device which is mounted in the block 14 and is described below.

FIG. 7 shows the block 14 in cross-section through the passageway 15 and shows the ducts 16 and 18 and a plug member 5 which has been pushed by the rod 19 into the passageway 15 out of a plug-transporting member 32 which can be moved to and fro along a horizontal bore 33 in the block 14 by a rod 34 which is connected to the piston of a pneumatically operated piston and cylinder arrangement (not shown).

FIG. 8 shows a view of the member 32 as seen in the direction of the arrow VIII in FIG. 7 and FIGS. 9A and 9B show the member 32 in two positions, when viewed as indicated by the arrow IX in FIG. 8, these FIGS. 9A and 9B also showing a plug member 5.

The plug-transporting member 32 consists of a metal cylinder with a groove 35 cut in its surface, the groove having end portions 36 and 37 which are parallel to the axis of the member 32 and an intermediate portion which extends helically along, and a quarter-turn around, the member 32. A pin 38 projects through a hole in the block 14 and into the groove 35 and it ensures that when the member 32 is pushed by the rod 34 to the right, into the position shown in FIG. 7, or pulled by the rod 34 to the left, out of the position shown in FIG. 7, the member 32 rotates through 90°, although it does not rotate during the first part and the last part of the movement by virtue of the end portions 36 and 37 being parallel to the axis of the member 32. At the end of the member 32 remote from the rod 34, the member 32 is formed with two projecting fingers 39 which, in the lower half (considering FIG. 9B) are spaced apart so as to receive a plug member 5 between them and to grip it lightly, whereas in the upper half (still considering FIG. 9B) they are too close together to receive a plug member 5 between them but are sufficiently far apart to permit the rod 19 to pass between them.

The plug member 5 is positioned between the two fingers 39, by an arrangement which is described below, when the member 32 is to the left of the position shown in FIG. 7, the plug member 5 then lying horizontally as shown in FIG. 9A. Then the rod 34 is actuated to push the member 32 to the right to the position shown in FIG. 7, during which movement the member 32 turns through 90° until the plug member 5 lies vertically, in the position shown in FIG. 9B, above the passageway 15 whereafter the rod 19 can be lowered between the fingers 39 to push the plug member 5 into the passageway 15 and into the position shown in FIG. 7.

FIG. 10 shows a plan view of the block 14, with the plug transporting member 32 to the left, and it also diagrammatically shows a rod 40, which is secured to the piston of a pneumatically operated piston and cylinder arrangement (not shown) for pushing the plug members 5 one at a time along a horizontal passage 41, from a recess 42, into the space between the fingers 39. In the recess 42 there is a vertical column of three or four plug members 5, which is one end of a long row of such members, touching one another.

The plug members 5 reach the recess 42 by way of a conventional vibrator bowl feeder (which is not shown) and by way of a feed device which is shown in FIG. 11 which they enter and leave with their axes horizontal, although they enter it extending in one direction and leave it extending in exactly the opposite direction, i.e. the direction indicated in FIG. 10, this being by virtue of the fact that the plug members 7 pass along a track 43 which extends helically along, and half a turn around, a vertical cylinder 44. The plug members drop from the track 43 into the recess 42. Thus, in this example the plug members are allowed to move forward in a row under the action of gravity but they could instead be forced forward.

Before the leading plug member of the row of plug members is pushed into the passage 41, the next one in the row is prevented from falling into the bottom of the recess 42 by a screw which engages the end 6 of that plug member and presses the plug member against the block 14. FIG. 12 shows this screw, referenced 45, pressing against a plug member 5B which is next to the plug member, 5A, which is about to be pushed out of the recess 42 and into the passage 41 by the rod 40. The screw 45 is screwed into a lever 46 which is pivotally mounted on a bracket 47 and is urged to turn anticlockwise (considering FIG. 12) by a compression spring 48, so that the screw 45 is urged into contact with the plug member 5B and that plug member and those behind it in the row are unable to move while the plug member 5A is pushed into the space between the fingers 39 of the plug transporting member 32. When, or shortly before, the plug transporting member 32 starts to move towards the position shown in FIG. 7, the rod 40 is withdrawn and an abutment 49 carried by the rod strikes a hook 50 which projects from the lever 46, the result being that the lever 46 is turned clockwise, the screw 45 becomes disengaged from the plug member 5B and all the plug members in the row are released to move forward, the plug member 5B dropping into position for being pushed into the passage 41. Instead of the plug member 5B being temporarily gripped between the screw 45 and the block 14, a barrier could be temporarily placed beneath it, to prevent it from dropping into the recess 42 until the appropriate instant.

FIG. 13 shows an arrangement for sensing whether or not a plug member 5 is in the position illustrated in FIG. 9B, i.e. between the fingers 39 and directly above the passageway 15. When a plug member does reach that position, it abuts and displaces to the right a screw 51 which is mounted at one end of a lever 52, which consequently turns anticlockwise (considering FIG. 13) and another screw 53 mounted on the other end of the lever 52 actuates a pneumatic valve which is diagrammatically illustrated by the rectangle 54. When, and only when, the valve 54 is actuated, indicating that a plug member 5 really is in the position mentioned above, there is effected the initiation of the supply of the material to the tube 1 by way of the duct 16 and the passageway 15. Thus, there is no danger of a tube 1 being filled if there is no plug member 5 ready to seal it, and the mess which this would entail is avoided. When the plug member 5 has been pushed by the rod 19 from between the fingers 39, a restoring force is applied to the lever 52, bringing it back into a position where the arrival of another plug member 5 at the aforementioned position can be sensed. Of course, anti-clockwise turning of the lever 52 could actuate an electrical arrangement for initiating the supply of material to the tube 1 and numerous other ways of sensing whether or not a plug member 5 is in the appropriate position, and for initiating the supply of material to the tube 1 only if this is so, could be devised.

FIG. 14, and FIG. 15 which is a plan view, show more fully the delivery valve 17 of FIG. 5. This comprises a valve member 54 in the form of a rod having at one end a semi-circular recess 52 and being surrounded near that end by an O-ring 54A, the valve member 54 being supported within a chamber 53, which opens into the duct 16, by perforated rings 55 and being movable to the left and to the right by a link 56. When the valve member 54 is moved to the right, the O-ring 54A is carried into the duct 16 and seals that duct, i.e. closes the valve 17, and the surface of the valve member 54 in the recess 52 co-operates with the block 14 in forming a vertical and substantially circular passage for a plug member, as can be seen from FIG. 15. A rotary valve 57 is provided which, in the illustrated position, connects the chamber 53 to receive material, with which the tubes 1 are to be charged, from a metering cylinder 58 which has a piston 59 in it. In another position of the rotary valve 57, attained by turning it clockwise through 90°, the metering cylinder 58 is connected to receive the material from a hopper 60, if the material is of low viscosity, or from a pump if it is of high viscosity or is a mastic composition. The rotary valve 57 is driven from the first position to the second position, then back to the first position, then back to the second position, and so on, by a link 61 which is coupled to a piston 62 of a pneumatically operated piston and cylinder arrangement. The rotary valve 57 and the link 56 which drives the valve member 54 are coupled together by linkage which is diagrammatically illustrated and represented by the lines marked 63. When the rotary valve 57 is in the position which is not illustrated and the metering cylinder 58 is receiving material from the hopper 60 or from the pump, the O-ring 54A is in the duct 16, i.e. the delivery valve 17 is closed. During this operation, the piston 59 is moved downwardly to draw the material into the metering cylinder. Some time after the appropriate quantity has been drawn into the metering cylinder 58, which may be indicated by a piston rod attached to the piston 59 encountering a stop, the rotary valve 57 is brought to its illustrated position by movement of the piston 62 and at the same time the valve member 54 is pulled away from the duct 16, i.e. the delivery valve 17 is opened, whereupon upward movement of the piston 59 is effected to deliver the material from the metering cylinder to the chamber 53 and thence to the tube 1 by way of the duct 16 and the passageway 15.

The stop which is encountered by the piston rod attached to the piston 59 may be adjustable in position by a hand-wheel which drives the stop up and down through a bevel gearing arrangement, in order to control the amount which is supplied to each container 1.

It has been found that by using a pump to supply the material to the metering cylinder 58 by way of a rotary valve 57, liquids of high viscosity and mastic compositions can reliably and quickly be charged into the tubes 1.

The movements of the different parts of the machine are all synchronised and controlled by an electric control system which need not be described here.

FIG. 16 shows a block 14 in several parts, a plug transporting member 32 formed with fingers 39 and a groove 35 with a straight part 37, and a rod 19 for pushing plug members out of the space between the fingers 39, which space includes a socket portion 63 in which the plug members are held, all this being substantially as in the machine first described. A reduced end portion 64 of a rod 65 projects into the socket portion 63 when the plug transporting member 32 is in its right-hand position, as illustrated, and when, as illustrated, there is no plug member carried by it. The end portion 64 is urged into that position by a compression spring 66 acting on a flange 67 on the rod 65. A spigot 68 projects from the flange 67 and can, when the rod 65 is displaced to the right, enter and close a passage 69 joining two chambers 70 and 71. An entry 72 into the chamber 71 is connected to a source of compressed air at, say, 4 pounds per square inch above atmospheric pressure and an exit 73 from the same chamber is connected to a diaphragm valve. An exit 74 from the chamber 70 leads to exhaust. In the illustrated condition, air enters the entry 72, passes through the passage 69 and leaves through the exit 74. The diaphragm valve is not operated and the piston 62 of FIG. 14 is not caused to open the valve 17, so the container 1 is not filled. When, however, a plug member 5 carried by the plug-transporting member 32 strikes the end portion 64 of the rod 65, the passage 70 is closed by the spigot 68 and so the air pressure in the chamber 71 increases and this causes operation of the diaphragm valve connected to the exit 73 and this in turn causes the piston 62 to be actuated so as to open the valve 17 and filling of the container 1 proceeds.

FIG. 17 shows a plan view of a shuttle 75 which is mounted on one side of the block portion 14 and can be moved lengthwise by a pneumatically operated piston and cylinder arrangement 76, which is shown only diagrammatically. The shuttle has a circular bore 77 through it and in the illustrated position of the shuttle this bore is in line with a passage 78 in the block portion 14, which passage leads to a vacuum pump, and with one end of a row of plug members 5 touching one another and supported within a tube 79. The leading plug member in the row is sucked into the bore 77 with the end 7 foremost, by the vacuum when the shuttle is in the illustrated position and then the shuttle is displaced to the right so that the plug member 5 carried by it becomes in line with the rod 40 and the passage 41, which correspond to the parts 40 and 41 of FIG. 12. The rod 40 then pushes the plug member into the passage 41 and into the space between the fingers 39 of the plug transporting member 32 and when the rod 40 has been retracted the shuttle is returned to its original position to receive the next plug member.

Instead of using the arrangement shown in FIG. 11, the plug members may be gravity-fed in a row, touching one another, through a plastics tube which has a vertical portion the top of which is connected to receive the plug members from a vibrator bowl feeder, there being a bend at the bottom of the vertical portion of the tube, leading to a horizontal portion which in turn leads to the recess 42 of FIG. 12 or the bore 77 of FIG. 17.

FIG. 18 illustrates a turntable 80 which is turned stepwise, 60° at a time, about its central axis, which is vertical, and on which there are mounted in six support devices 81 for containers 1, each of these being substantially in accordance with FIGS. 2 and 3, This turntable cooperates with a single filling head having the parts shown in FIGS. 4 to 10, 14 and 15, the arrangement according to FIG. 11 or the plastic tube, the arrangement according to FIG. 12 or 17 and the arrangement according to FIG. 13 or 16. When a support device 81 reaches the position shown uppermost, the container 1 held by it is evacuated, filled and sealed and while this is happening empty containers may be placed on, and already filled containers removed from, the other support devices. There may be a sensing device for sensing whether or not there is a container held by the support device 81 that is in the position shown uppermost in FIG. 18 and for ensuring that, if there is not, the turntable is turned one step further forward.

We claim:
1. A machine for charging with a flowable material a succession of containers each having a filling opening and for sealing each of them with a plug member when it has been charged, comprising a passageway, support means for supporting the containers one at a time with the filling opening presented to one end of the passageway, delivery means for delivering said material into the passageway and thence into a container supported by said support means, a plunger which can move along the passageway, actuating means for moving the plunger along the passageway towards said one end and for subsequently moving it back again, and supply means for placing plug members one at a time in a position in the path of the movement of the plunger towards said one end but not impeding the delivery of said material to said container, whereby after said material is delivered into said container the plunger pushes a plug member from said position along the passageway and into the filling opening of said container, sealing the opening, and control means which senses whether or not a plug member is in said position and controls initiation of delivery of said material by said delivery means such that material is delivered into said container if and only if a plug member is in said position.

2. A machine according to claim 1, wherein said control means comprises a lever carrying a member which is displaced by a plug member when the latter moves into said position which causes the lever to rock, and a pneumatic valve operated by said lever to initiate delivery of the material to said container.

3. A machine according to claim 1, wherein said control means comprises a rod which is urged into a place where it is abutted and displaced lengthwise by a plug member when the latter moves into said position, said rod carrying a part which when the rod is displaced closes a passage leading from a chamber, there being an inlet to the chamber from a source of compressed gas and an outlet from the chamber to a pneumatically operated valve which operates when said passage is closed to initiate delivery of the material to said container.

4. A machine according to claim 1, wherein said supply means comprises means to provide a row of the plug members touching one another and moving forward, a rod for pushing the leading plug member in the row, an abutment carried by the rod, a holding member for holding the next plug member in the row while the rod is pushing the leading plug member and a device actuated by said abutment on reversal of movement of the rod and then causing movement of said holding member so that the latter then releases the next plug member.

5. A machine according to claim 1 wherein said supply means comprises a shuttle having a hole for receiving a plug member, means for displacing the shuttle to a first position and a second position alternately, means for supporting the plug members so that they form a row with one end on one side of the shuttle in line with said hole when the shuttle is in said first position, a member formed with a passage on the other side of the shuttle, said passage being in line with said hole when the shuttle is in said first position, means to create a vacuum in said passage to draw a plug member from said row into said hole when the shuttle is in said first position, and a push rod for displacing the plug member from said hole when the shuttle is in said second position.

6. A machine according to claim 1, wherein said supply means comprises a plug-transporting member formed with two fingers between which one of the plug members can be gripped and between which said plunger can move and means to displace said plug-transporting member from a first position in which a plug member can be supplied to it to a second position in which the plug member is in the position in the path of movement of the plunger.

7. A machine according to claim 6, wherein said plug-transporting member is cylindrical and is displaced lengthwise and is formed with a slot which at both ends is parallel to the axis of the plug-transporting member and between the ends extends around and along the member on a path which is part of a helix, and a fixed member which projects into the slot so that the lengthwise movement of the member causes turning of the latter about its axis.

8. A machine according to claim 1, wherein said delivery means comprises a material-supply device, a metering cylinder, a piston movable in the metering cylinder, a chamber, a first valve member which can occupy a first position in which it connects the metering cylinder to the material-supply device but neither of them to said chamber and can occupy a second position in which it connects the metering cylinder to said chamber but neither of them to the material-supply device, a second valve member for closing a connection between said chamber and said passageway and means for actuating the first and second valve members simultaneously so that the first valve member is in its first position when said connection is closed and is in its second position when said connection is not closed.

9. A machine according to claim 8, wherein said second valve member includes an end portion which has a surface partly defining said passageway.

10. A machine according to claim 1, comprising further support means for supporting other containers, a turntable carrying all the support means and movable stepwise to bring containers carried by the different support means into registry with said passageway successively.

11. A machine according to claim 1, wherein said actuating means for said plunger comprises a first piston outside said passageway and connected to said plunger, a second piston disconnected from the first piston but arranged to move in a first direction and to carry the first piston with it, a third piston disconnected from the second piston but arranged to move in said first direction and to carry the second piston with it, and means for applying fluid at pressure firstly to said third piston then to said second piston and then to said first piston, in each case causing the piston to move in said first direction which results in said plunger pushing a plug member firstly to said position then to an intermediate position and finally into a filling opening in a container.

12. A machine for charging with a flowable material a succession of containers each having a filling opening and for sealing each of them with a plug member when it has been charged, comprising a passageway, support means for supporting the containers one at a time with the filling opening presented to one end of the passageway, delivery means for delivering said material into the passageway and thence into a container supported by said support means, a plunger which can move along the passageway, actuating means for moving the plunger along the passageway towards said one end and for subsequently moving it back again, and supply means for placing plug members one at a time in a position in the path of the movement of the plunger towards said one end but not impeding the delivery of material to said container, whereby after said material is delivered into said container the plunger pushes a plug member from said position along the passageway and into the filling opening of said container, sealing the opening, said supply means comprising a shuttle having a hole for receiving a plug member, means for displacing the shuttle to a first position and a second position alternately, means for supporting the plug members so that they form a row with one end on one side of the shuttle in line with said hole when the shuttle is in said first position, a member formed with a passage on the other side of the shuttle, said passage being in line with said hole when the shuttle is in said first position, means to create a vacuum in said passage to draw a plug member from said row into said hole when the shuttle is in said first position, and a push rod for displacing the plug member from said hole when the shuttle is in said second position.

13. A machine according to claim 1, wherein said supply means includes means to provide a row of the plug members touching one another and moving forward, means to separate the leading plug member in the row and feed it to said position and means to prevent the next plug member in the row from immediately following the separated leading plug member.

References Cited

UNITED STATES PATENTS

| | | | |
|---|---|---|---|
| 1,083,768 | 1/1914 | Stone | 53—306 |
| 3,133,388 | 5/1964 | Honisch | 53—281 X |

FOREIGN PATENTS

| | | |
|---|---|---|
| 43,902 | 12/1916 | Sweden. |
| 426,535 | 6/1967 | Switzerland. |

TRAVIS S. McGEHEE, Primary Examiner

R. L. SPRUILL, Assistant Examiner

U.S. Cl. X.R.

53—268, 328